United States Patent
Mnushkin

(10) Patent No.: US 10,350,510 B2
(45) Date of Patent: Jul. 16, 2019

(54) MASS TRANSFER COLUMN OF CROSS FLOW OF LIQUID AND GAS (VAPOUR) PHASES

(71) Applicant: Igor Anatol'evich Mnushkin, Ufa (RU)

(72) Inventor: Igor Anatol'evich Mnushkin, Ufa (RU)

( * ) Notice: Subject to any disclaimer, the term of this patent is extended or adjusted under 35 U.S.C. 154(b) by 0 days.

(21) Appl. No.: 15/740,973

(22) PCT Filed: Jul. 25, 2016

(86) PCT No.: PCT/RU2016/000477
§ 371 (c)(1),
(2) Date: Dec. 29, 2017

(87) PCT Pub. No.: WO2017/010916
PCT Pub. Date: Jan. 19, 2017

(65) Prior Publication Data
US 2018/0369712 A1 Dec. 27, 2018

(30) Foreign Application Priority Data
Jul. 10, 2015 (RU) .................. 2015127880

(51) Int. Cl.
*B01D 3/24* (2006.01)
*B01J 19/32* (2006.01)
(Continued)

(52) U.S. Cl.
CPC ............ *B01D 3/24* (2013.01); *B01D 3/14* (2013.01); *B01D 3/4205* (2013.01); *B01J 19/32* (2013.01); *B01D 3/22* (2013.01); *B01D 2202/00* (2013.01)

(58) Field of Classification Search
CPC . B01D 3/22; B01D 3/24; B01D 3/4205; B01J 19/32
See application file for complete search history.

(56) References Cited

U.S. PATENT DOCUMENTS 3,362,696 A * 1/1968 Vaughan .................. B01D 3/22
261/114.1
7,648,128 B2 * 1/2010 Lee .......................... B01D 3/20
261/114.1
(Continued)

FOREIGN PATENT DOCUMENTS

EP 0 300 506 A2 1/1989
RU 18 646 U1 7/2001
(Continued)

OTHER PUBLICATIONS

International Search Report for PCT/RU2016/000477 (PCT/ISA/210) dated Feb. 2, 2017
(Continued)

*Primary Examiner* — Jonathan Miller
(74) *Attorney, Agent, or Firm* — Birch, Stewart, Kolasch & Birch, LLP

(57) ABSTRACT

What is described relates to cross-flow packing heat and mass transfer column vessels, where rectifying separation of liquid-vapor mixtures, distillation of liquid-vapor mixtures, and absorptive separation of liquid-vapor mixtures occur, and may be used in oil-refining, petrochemical, chemical, gas, food, and other industries. The proposed mass transfer column with cross flow of liquid and gas (vapor) phases includes shell, feed nozzle, distillate and residue withdrawal nozzles, nozzles of injection and withdrawal of auxiliary flows, cross-flow packing sections separated heightwise by horizontal baffles having, successively, in direction of gas (vapor) phase, in normal shell cross section, a window for gas (vapor) flowing on packing section inlet side and continuous area on packing section outlet side, which alternate on horizontal baffles neighboring by height, with liquid distributors between packing adjacent sections and above packing upper section, which consist of three successively mating parts: horizontal leaf, set of steps, and blind pocket.

16 Claims, 15 Drawing Sheets

(51) Int. Cl.
  *B01D 3/14* (2006.01)
  *B01D 3/42* (2006.01)
  *B01D 3/22* (2006.01)

(56) References Cited

U.S. PATENT DOCUMENTS

| | | | |
|---|---|---|---|
| 8,128,072 B2* | 3/2012 | Raynal | B01D 3/24 |
| | | | 261/114.1 |
| 8,800,971 B2* | 8/2014 | Chommeloux | B01D 3/20 |
| | | | 261/114.1 |
| 9,427,678 B2* | 8/2016 | Bechtel | B01D 3/166 |
| 9,770,701 B2* | 9/2017 | Mnushkin | B01D 3/26 |
| 2004/0099970 A1* | 5/2004 | Zich | B01D 3/12 |
| | | | 261/114.5 |
| 2017/0239639 A1* | 8/2017 | Mnushkin | B01D 11/043 |

FOREIGN PATENT DOCUMENTS

| | | |
|---|---|---|
| RU | 2 292 947 C1 | 2/2007 |
| SU | 1044320 A | 9/1983 |

OTHER PUBLICATIONS

Written Opinion of the International Searching Authority for PCT/RU2016/000477 (PCT/ISA/237) dated Feb. 2, 2017.

\* cited by examiner

MASS TRANSFER COLUMN OF CROSS FLOW OF LIQUID AND GAS (VAPOUR) PHASES

TECHNICAL FIELD

The invention relates to cross-flow packing mass transfer column vessels, where rectifying separation of liquid-vapour mixtures, distillation of liquid-vapour mixtures, and absorptive separation of liquid-vapour mixtures occur, and may be used in oil-refining, petrochemical, chemical, gas, food, and other industries.

PREVIOUS TECHNICAL KNOWLEDGE

The generic aspect of mass transfer columns using cross-flow packing contact devices is independence of flow cross sections for liquid and gas (vapour) phases, which allows developing column vessels with optimal hydrodynamic modes for each of the communicating phases, furthermore, these vessels are characterized by a low hydraulic resistance, which is especially important for vessels operating at a sub-atmospheric pressure.

The prior art discloses a hydrocarbon fractionation plant containing a rectification column, the inlet of which is connected with a feed line equipped with a heat exchanger, a heater and a feed drum, the column top is connected with propane-butane fraction removal line equipped with an air cooler, a reflux condenser, and the column bottom is connected with the pentane-hexane fraction removal line connected to the heat exchanger, furthermore, the column additionally has a cooler condenser installed parallel to the heat exchanger and connected to the propane-butane fraction removal line upstream of the air cooler, and the rectification column contains a cross-flow stacked packing (utility certificate RU 54805 U1, IPC B01D3/14, C07C7/04, claimed on 17 Nov. 2005, published on 27 Jul. 2006). Disadvantage of this certificate is lack of design specifics of the cross-flow stacked packing, while the rectification column diagram in FIG. 1 allows to believe that, in fact, the authors described not a cross-flow, but rather a counter-flow packing column.

The prior art discloses a mass transfer column with a low hydraulic resistance and with perforated grids tiered by the column height and having packing layers on them. The grids are made as ramped steps placed alternately in diametrically opposite directions in the grids adjacent by height; and the rear and lateral edges of the steps in the grid ramp direction have the upright flanging to retain the liquid and the ramped stepped grids are equipped with vertical, closely positioned same-height screw packing elements. Vapour goes through the slots in the steps to the screw packing layer, herewith contacting with the liquid and entraining it, which results in the vapour-liquid emulsion with a highly-developed interfacial mass transfer surface; and this is accompanied by cross flow of vapour and liquid, where the vapour flows upward almost according to the ideal displacement model and the liquid flows in the packing layer diametrically according to the model close to the ideal displacement model with the full mixing by the height of the packing layer (patent RU 2055627 C1, IPC B01D3/22, claimed on 16 Dec. 1992, published on 10 Mar. 1996). Disadvantages of this patent are:

low performance of packing devices in the narrow range of stable operation, since their operation is required only in close-to-flooding conditions, therefore, when the column operating mode changes in terms of the vapour and liquid flow rates deviating from the conditions of emulsification and flooding, using this column makes no sense as the patent's author says;

the column operation only with high flow rates of vapour phase, when the vapour phase overpressure approaches hydraulic resistance of the contact device, otherwise the liquid phase falls through the slots in the steps almost without contacting with the vapour phase;

inability to arrange for full mixing of vapour and liquid along the packing layer height, because the liquid phase layer in the packing is determined by the step flanging only, and when in the form of foam it almost cannot rise along the packing layer, given the actual flow rates of the vapour phase in the column are low;

excessive complexity of the column's structural design and installation, due to close positioning of the screw packing elements.

The prior art also discloses the mass transfer cross-flow packing column including a shell, feed and reflux nozzles, distillate and residue withdrawal nozzles, cross-flow packing sections separated heightwise by horizontal baffles having, successively, in the direction of gas phase, in the normal shell cross section, a window for the gas flowing on the cross-flow packing section inlet side and a continuous area with manholes on the cross-flow packing section outlet side, which alternate on the horizontal baffles neighbouring by height; the horizontal baffles in the area of the cross-flow packing have holes for liquid phase passing (utility certificate RU 18646 U1, IPC B01D3/16, B01J19/32, claimed on 16 Dec. 2000, published on 10 Jul. 2001). Disadvantages of this certificate are:

narrow range of the contact device stable operation due to upset dynamics of liquid film flow over the packing surface with the stream interruption and potential gas phase breakthrough the contact device without contacting with liquid phase, which results in reduction of heat and mass transfer efficiency inside the packing, given the liquid phase flow rate reduction, and with inevitable liquid film partial tearing-off the packing surface on the section outer side, and splitting of the torn-off liquid film into drops by the gas upflow, with its further throwing onto the upstream contact device, which deteriorates separation of base mixture in the column, generally due to hydraulic resistance growth at liquid phase growing flow rate;

liquid phase flow through the holes in the horizontal baffle playing the role of liquid phase distributor from the upstream cross-flow packing section to the downstream one, which leads to fluctuations of continuous liquid phase level in the packing layer, when the liquid phase flow rate changes, which results in respective change of gas phase cross section in the cross-flow packing and indirectly in change of separation efficiency in the entire column.

The prior art also discloses the mass transfer column with packing block modules installed one above the other, with liquid phase distributors installed in-between; each block module consists of several packing sections separated heightwise by horizontal baffles having, successively, in the direction of the gas phase, in the normal cross section of the shell, a window for gas flowing on the packing section inlet side and a continuous area on the packing section outlet, which alternate on the horizontal baffles neighbouring by height; herewith, horizontal baffles in the packing sections' area have holes for counter-flow of liquid and vapour phases, and the packing is used for cross-flow of liquid and gas phases (patent RU 2292947 C1, IPC B01D47/14, B01D53/18, B01J19/32, claimed on 21 Sep. 2005, published on 10 Feb. 2007). Disadvantages of this patent are:
- lack of a distributor between packing sections of the packing block module, which leads to upset uniformity of the liquid phase flow pattern within the packing block module by packing sections;
- counter-flow of liquid and vapour phases through the holes in horizontal baffles, which dramatically narrows the range of stable operation of the column because when the gas phase flow rate is low, the separate flow begins, gas phase passing through some holes of the horizontal baffle and liquid phase through the remaining holes of horizontal baffle, which leads to non-uniform reflux of downstream section packing and, as a consequence, reduction of its performance, and gas phase high flow rate is accompanied by flooding effect of the upstream section packing, which also leads to reduction of its performance.

The prior art also discloses a heat and mass transfer column that is the closest one to the claimed invention, and consists of a shell, cross-flow packing sections limited on the two opposite sides by continuous side walls and separated heightwise by horizontal baffles having in the gas phase direction and in the shell normal cross section successively, a window for gas flowing on the cross-flow packing section inlet side and a continuous area on the cross-flow packing section outlet side, which alternate on the horizontal baffles neighbouring by height, with liquid distributors between adjacent sections of the cross-flow packing and above upper section of the cross-flow packing (inventor's certificate SU 1044320 A, IPC B01D53/20, claimed on 22 Jun. 1982, published on 30 Sep. 1983). Disadvantages of this author's certificate are:
- optimal column operation only at the design (rated) capacity and in the fractionation mode, when the liquid phase level in distributors is determined by the distributor flanging;
- low range of column's stable operation due to fixed maximum liquid phase level in the distributors determined by distributor flanging, which ensure the uniform reflux of downstream sections of the cross-flow packing through the holes in distributor's horizontal baffle;
- reduction of liquid phase level in the liquid distributor at the flow rate decrease resulting in this phase flow only through some holes in the distributor's horizontal baffle; herewith, reflux of downstream section packing will become non-uniform due to gas phase flowing through the remaining holes to the upstream section, which will lead to reduction of its performance;
- overfilling of the liquid distributor space in case of increase in capacity and/or reflux flow rate exceeding the rated values and the excess overflowing over the distributor flanging into to the channel between the column shell and cross-flow packing sections, in which gas phase flows from the respective downstream section to the upstream section; this liquid phase excess is withdrawn from the mass transfer area between liquid and gas phases, which leads to reduction of performance of the entire column.

The common disadvantage of described designs of packed columns with cross flow of liquid and gas (vapour) phases is the narrow range of stable operation with a highly efficient mass transfer between liquid and gas phases, which depends on the column's design capacity and operating mode. However, the commercial operation of packed columns with cross flow of liquid and gas (vapour) phases systematically witnesses situations requiring a considerable deviation from the column design specifications, including:
- loss of the column capacity due to reduction in feedstock supplied for processing or demand in final products, which leads to heightwise reduction of liquid and gas (vapour) phases' flow rates;
- increase of the column capacity due to growth of demand in final products, which leads to heightwise increase of liquid and gas (vapour) phases' flow rates;
- improvement for the produced distillate quality and/or residue with the column capacity maintained, which requires to increase the reflux and/or vapour ratios in the fractionation mode and indirectly to heightwise increase of liquid and gas (vapour) phases' flow rates;

In all described cases, flexible operation of packed columns with cross flow of liquid and gas (vapour) phases is impossible without a considerable extension of the vessel stable operation range with a high efficiency of mass transfer between liquid and gas (vapour) phases.

DISCLOSURE OF INVENTION

The object of this invention was to improve the design of mass transfer column with cross flow of liquid and gas (vapour) phases in order to considerably extend the vessel stable operation range.

The set object can be achieved due to the fact that in mass transfer column of cross flow of liquid and gas (vapour) phases including:
- a shell,
- a feed nozzle,
- distillate vapor and residue withdrawal nozzles,
- nozzles of injection and withdrawal of auxiliary process gas (vapour) and liquid flows, and
- cross-flow packing sections limited on two opposite sides by continuous side walls and separated heightwise by horizontal baffles having, successively, in the direction of gas (vapour) phase, in normal cross section of the shell, a window for gas (vapour) flowing on the inlet side of the cross-flow packing section and a continuous area on the outlet side of the cross-flow packing section, which alternate on the horizontal baffles neighbouring by height;
- liquid distributors between the adjacent sections of the cross-flow packing and above the upper section of the cross-flow packing comprise a part A, a part B and a part C;
  - wherein the part A is the horizontal baffle with a bent-down edge tightly, the horizontal baffle attached to said two opposite continuous side walls and mated to a part B on the opposite side;
  - wherein the part B is shaped as a set of steps, each step being made of two mating continuous end and perforated drain plates that are tightly attached to said two opposite continuous side walls limiting the cross-flow packing section, the drain plate of a lower step being mated to a part C;
  - wherein the part C is shaped as a blind pocket tightly attached to said two opposite continuous side walls, with a bottom and a side, an upper edge of the blind pocket side being mated to the drain plate of the part B lower step;
  - wherein the blind pocket is mated to the shell and the bent-down edge of the part A horizontal baffle is lowered into part C with a gap relative to the blind pocket bottom; and
  - wherein the upper step of part B is equipped with a vertical plate partially isolating the gas phase outflow from the packing layer of the cross-flow packing downstream section and the lower part of the packing layer of the cross-flow packing upstream section.

The suggested design of liquid distributor allows, depending on the liquid phase (reflux) actual flow rate, to introduce in the process the entire volume of packing section cross-flow packing or the required part of its volume, and specifically, include into mass transfer process the required part of each packing section cross-flow packing volume, when the reflux flow rate changes along the column height. This allows extending the column stable operation range, when it is operated within the limits from the hypothetically minimum to the hypothetically maximum reflux flow rate, due to the fact that, as the reflux flow rate increases, equivalent filling of the stepped liquid distributor occurs from the lower step to the upper one and new layers of mass transfer cross-flow packing are introduced in the mass transfer process from the area of gas (vapour) phase outflow from the packing section at minimum reflux flow rate from the lower step of the liquid distributor to the area of gas (vapour) phase inflow into the packing section at maximum reflux flow rate from all steps of the liquid distributor. Alongside with that, combination of parts A, B and C makes the liquid distributor a hydraulic gate that separates upstream and downstream sections of cross-flow packing and does not allow the bypass breakthrough of gas (vapour) phase from cross-flow packing downstream section to the upstream one.

Vertical plate upper part of part B upper step partially isolates the packing layer lower part of the cross-flow packing upstream section by the height ensuring the liquid phase flow through the liquid distributor corresponding to the column maximum reflux flow capacity; herewith, the free space of liquid distributor between parts A, B and C is filled with liquid, and the packing layer lower part of the cross-flow packing upstream section is filled with liquid, ensuring the maximum height of liquid boosting in the liquid distributor and its maximum reflux flow capacity. In the event when the reflux flow rate exceeds the maximum allowable limit, vertical plate upper part of part B upper step serves a weir, over which the excessive reflux flows.

Vertical plate of part B upper step continues downwards after the distributor and partially isolates the outflow of gas (vapour) phase from the cross-flow packing downstream section packing layer, which allows preventing the bypass break of gas (vapour) phase through the space above the packing. Cross-flow packing section in the vertical cross section parallel to gas (vapour) phase flow, in the upper level, follows the stepped shape of part B of the liquid distributor, which ensures gradual expansion of gas (vapour) phase flow as it passes through the packing layer and as the differential pressure of the gas (vapour) phase concurrently falls due to reduction of the packing layer hydraulic resistance, and the uniformity of gas (vapour) phase flow rate in the packing layer, and in the lower level it is horizontal while supported by horizontal baffle of part A.

The liquid distributor steps, depending on the design operating cases of the column with cross flow of liquid and gas (vapour) phases, may have various configurations, as follows:

a) for a number of design cases with discrete uniform variation of the column reflux ratio with continuous or minor variation of mass transfer driving force in the liquid-gas (vapour) system in the cross-flow packing volume, it is reasonable to place the drain plates of part B of the liquid distributor horizontally, with equal width of the plates;

b) for a number of design cases with discrete uniform variation of the column reflux ratio with major variation of mass transfer driving force in liquid-gas (vapour) system in the cross-flow packing volume, particularly, with the mass transfer driving force decreasing in the direction of gas phase flow through the cross-flow packing, it is reasonable to place drain plates of the liquid distributor horizontally, with width of the plates gradually increasing from the lower step to the upper one;

c) for a number of design cases with a wide range of variation of the column reflux ratio close to the indiscrete one, with continuous or minor variation of the mass transfer driving force in liquid-gas (vapour) system in cross-flow packing volume, it is reasonable to make drain plates of the liquid distributor inclined and place them at an acute angle to the horizon from the lower step to the upper one, with equal width of the plates;

d) for a number of design cases with a wide range of variation of the column reflux ratio close to the indiscrete one, with major variation of the mass transfer driving force in liquid-gas (vapour) system in cross-flow packing volume, particularly, with the mass transfer driving force decreasing in the direction of gas phase (vapour) flow through the cross-flow packing, it is reasonable to make drain plates of the liquid distributor inclined and place them at an acute angle to the horizon from the lower step to the upper one, with width of the plates gradually increasing from the lower step to the upper one.

Nozzles of injection and withdrawal of auxiliary process gas (vapour) and liquid flows are located on the mass-transfer column housing as per its process function. In particular, nozzles of rectification columns include a reflux injection nozzle in the column overhead, a reboiler vapour injection nozzle in the column bottom, a side flow nozzle, an azeotropizer nozzle for azeotrope rectification, an extraction agent nozzle for extractive rectification, and an absorbent nozzle is required in absorption columns.

It is reasonable that the gap between bent-down edge of the part A horizontal baffle and the bottom of the part C blind pocket is made no bigger than half height of the end plate of part B lower step, in order to generate the on the part C lower step the liquid phase level exceeding the differential pressure resulting from the liquid phase flowing through the perforated plate of the lower step of part B, which ensures the minimum flow rate of the column liquid phase.

At high capacity of the column with cross flow of liquid and gas phases, the required cross sections for liquid and gas (vapour) phases of the cross-flow packing sections become so large that it results in upset of gas (vapour) and liquid phases' flow pattern in them. Instead of horizontal, close to linear trajectory through the cross-flow packing section, the gas (vapour) phase flow attains the trajectory with the ascending inclination towards the horizon with generation of dead areas at the flow inlet and outlet of the packing, which leads to reduction of intense mass transfer volume in cross-flow packing section and, as a consequence, to reduction of the column fractionation efficiency. Furthermore, instead of film descending over the packing surface, the liquid phase flow begins flaking off the packing surface, partially breaks to drops moving to the section free space between packing components due to increase of gas phase flow rate in the flow core as compared with the design value reasoned by generation of dead areas. To eliminate the described disadvantages in design of high-capacity column with cross flow of liquid and gas (vapour) phases, it is reasonable to make the column symmetrically multi-flow for liquid and gas phases by placing in the vessel several similar rows of cross-flow packing sections with the described liquid distributors between the sections, which will allow putting the flow patterns in order and increase the fractionation efficiency. In case of the column multi-flow design, it is reasonable to join the bottoms of the part C blind pockets of the two symmetrical opposite sections of the cross-flow packings of the vertical set of cross-flow packing sections forming the single flow, using a solid bridge isolating the gas (vapour) phase supply channel.

In case of the mass transfer column reconstruction, it is as well reasonable, that the gap between bent-down edge of the part A horizontal baffle lowered into part C and the blind pocket bottom would have the height equal to the height of 15-30% of the part B lower steps; herewith, the edge of part A horizontal baffle is offset towards the upper step of part B equipped with a vertical plate by a value equal to the total length of 15-30% of the part B lower steps, which allows increasing the cross section of the cross-flow packing section and, hence, the mass transfer column liquid phase capacity with a certain narrowing of the column stable operation range from 15-30% to 100%.

LIST OF DRAWINGS

FIGS. 1 to 11 show the structural design of the claimed invention:

FIG. 1. General view of the mass transfer column of cross flow of liquid and gas (vapour) phases FIG. 2. Mass transfer column distributor FIG. 3. The distributor operating principle at the liquid phase minimum design flow rate FIG. 4. The distributor operating principle at the liquid phase operating flow rate FIG. 5. The distributor operating principle at the liquid phase maximum design flow rate FIG. 6. The distributor operating principle at the liquid phase over-maximum design flow rate FIG. 7 shows an embodiment of the claimed invention wherein Part B is shaped as a set of steps, in which the liquid distributor drain plates are positioned horizontally, with equal width of the plates FIG. 8 shows an embodiment of the claimed invention wherein Part B is shaped as a set of steps, in which the liquid distributor drain plates are positioned horizontally, with the width of plates gradually increasing from the lower step to the upper one FIG. 9 shows an embodiment of the claimed invention wherein Part B is shaped as a set of steps, in which the liquid distributor drain plates are made inclined and positioned at an acute angle to the horizon from the lower step to the upper one, with equal width of the plates FIG. 10 shows an embodiment of the claimed invention wherien Part B is shaped as a set of steps, in which the liquid distributor drain plates are made inclined and positioned at an acute angle to the horizon from the lower step to the upper one, with the width of plates gradually increasing from the lower step to the upper one FIG. 11. Fragment of a double-flow option of the multi-flow column FIG. 12 shows the distributor operating principle at offset of the horizontal baffle edge.

FIGS. 13 to 15 are the pictures of the test bench used in various hydrodynamic operating modes of the mass transfer packed column with the water-air system liquid distributor.

FIGS. 1 to 14 use the following legend:
1. Column shell
2. Cross-flow packing section
3. Feed nozzle
4. Distillate vapor withdrawal nozzle
5. Residue withdrawal nozzle
6. Reflux injection nozzle
7. Reboiler vapour injection nozzle
8. Part A of the liquid distributor-horizontal baffle with bent-down edge
9. Part B of the liquid distributor shaped as a set of steps
10. Part C of the liquid distributor shaped as a blind pocket with a bottom and a side
11. Vertical plate
12. Bridge
13. Liquid distributor
14. Continuous side wall

BRIEF DESCRIPTION OF DRAWINGS

The mass transfer column of cross flow of liquid and gas (vapour) phases operates, for example in case of rectification of the initial hydrocarbon vapour-liquid mixture, as follows (FIG. 1).

The feedstock—hydrocarbon vapour-liquid mixture—is fed for fractionation to column shell 1 with continuous side walls 14 and cross-flow packing sections 2 through feed nozzle 3, while being separated in the column free space into liquid and vapour phases. Distillate in the vapour phase and residue in the liquid phase resulting from fractionation are removed from column shell 1 through nozzles 4 and 5 respectively. A part of distillate having been condensed in the cooler (not shown in FIG. 1) returns to column shell 1 via reflux injection nozzle 6 for liquid reflux of upper cross-flow packing section 2. A part of residue having been evaporated in the reboiler (not shown in FIG. 1) returns to column shell 1 via nozzle 7 for vapour reflux of lower cross-flow packing section 2. In cross-flow packing sections 2, mass transfer occurs between vertically descending liquid phase film streaming down packing 2 and horizontally passing vapour phase flow, in the course of which the liquid phase is enriched with high-boiling feedstock components and the vapour phase with low-boiling ones. The vapour phase goes through the entire vertical cross section of cross-flow packing section 2 and the liquid phase goes through the part of the horizontal cross section of cross-flow packing section 2 that is proportional to the liquid phase flow rate, which is possible due to the design of the liquid distributor 13 consisting of three parts A, B and C: horizontal baffle with bent-down edge 8, set of steps 9 and blind pocket with bottom and side 10 respectively. The liquid phase flows from cross-flow packing upstream section 2 to horizontal baffle 8 of the liquid distributor 13 and streams down along the bent-down edge to blind pocket with side 10 in the amount proportional to the liquid phase flow rate, thus forming the appropriate liquid phase level in pocket with side 10 mated to ascending set of steps 9, each step having perforated holes in its horizontal area, to allow for the liquid phase streaming down to cross-flow packing downstream section 2, which ensures reflux of the respective fragment of cross-flow packing downstream section 2 (FIG. 2). Therefore, part of fragments of cross-flow packing downstream section 2 located under the lower steps of set of steps 9 filled with liquid phase, is refluxed with liquid phase and participates in the mass transfer process, and the remaining part of the mass transfer process. During mass transfer column operation, as the liquid phase flow rate increases as per the process mode, the next upper steps of set of steps 9 are filled and the next fragments of cross-flow packing downstream section 2 switch over to the mass transfer mode. Such operation of the liquid distributor 13 considerably extends the mass transfer column stable operation range.

Figure 1:
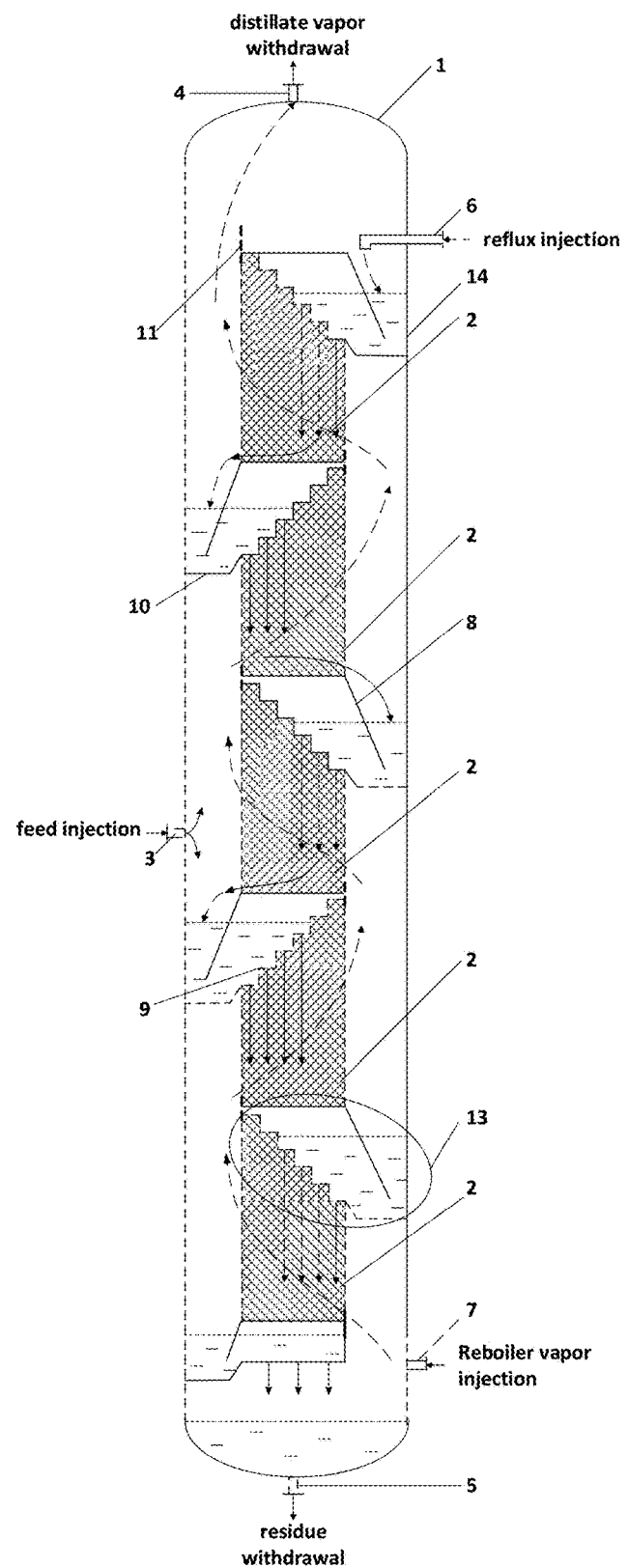
Figure 2:
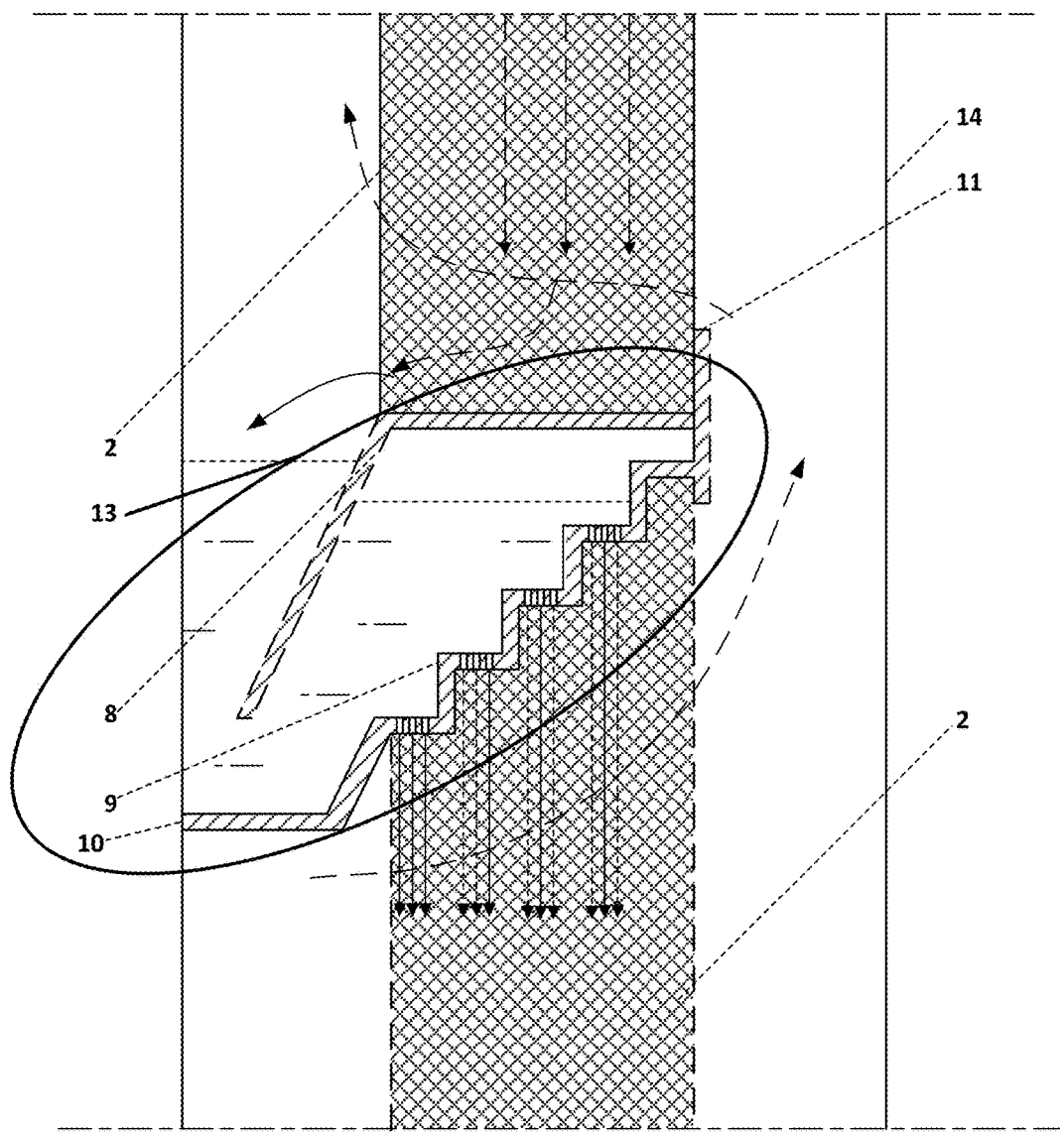
Figure 3:
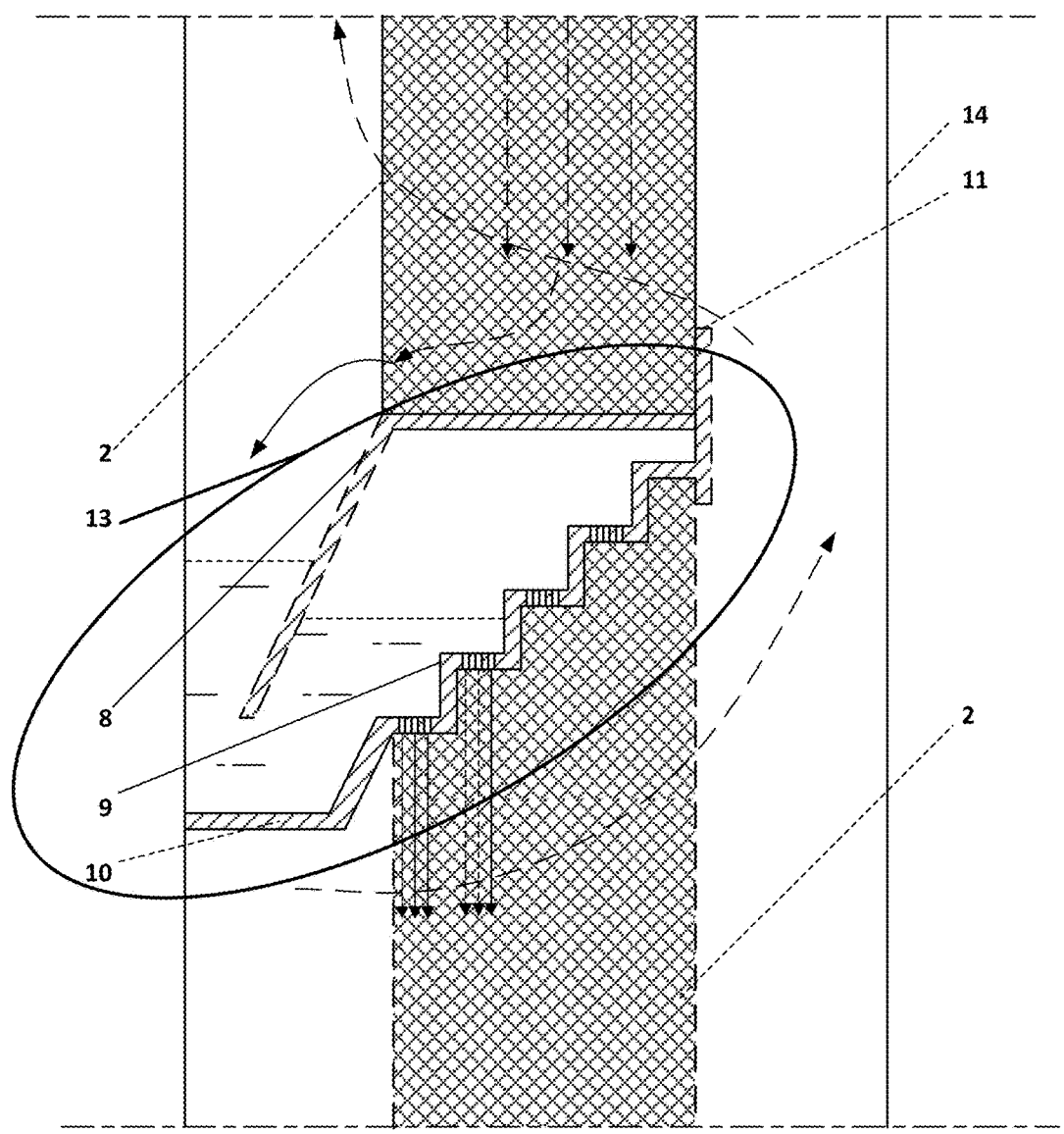

At liquid phase minimum design flow rate, the mass transfer column operates on the first lower step of set of steps 9 with the liquid phase level that exceeds the differential pressure when the liquid phase flows through the perforated plate of the first lower step, which ensures the required liquid phase flow in the column to the final packing fragment of cross-flow packing downstream section 2 in the direction of vapour stream (FIG. 3).

Figure 4:
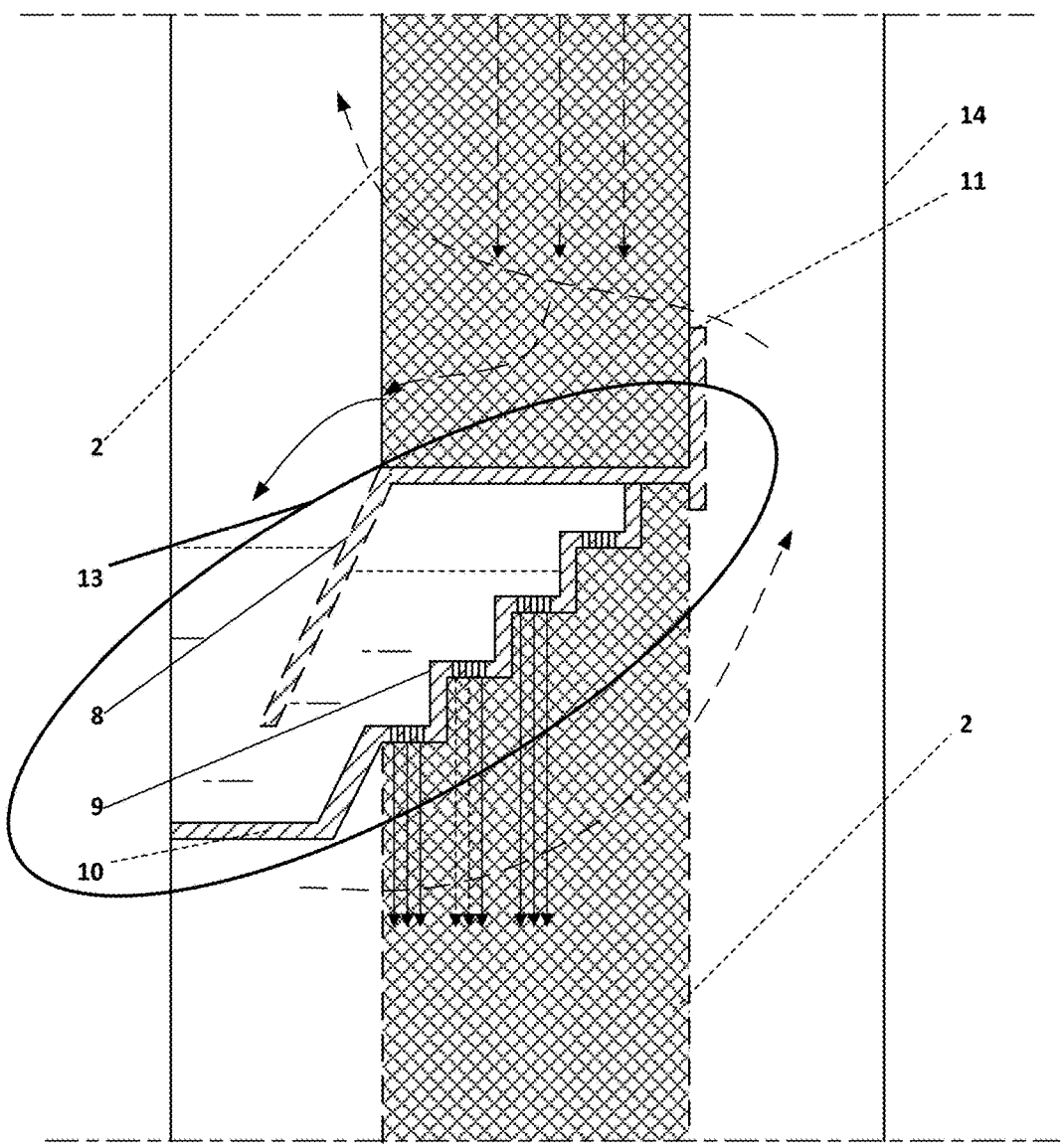

At a certain operation mode with a given liquid phase flow rate, the mass transfer column operates at the liquid phase level that provides filling of the respective part of lower steps of set of steps 9, which ensures the required liquid phase flow in the column to the respective packing fragments of cross-flow packing downstream section 2 in the direction of vapour stream (FIG. 4).

Figure 5:
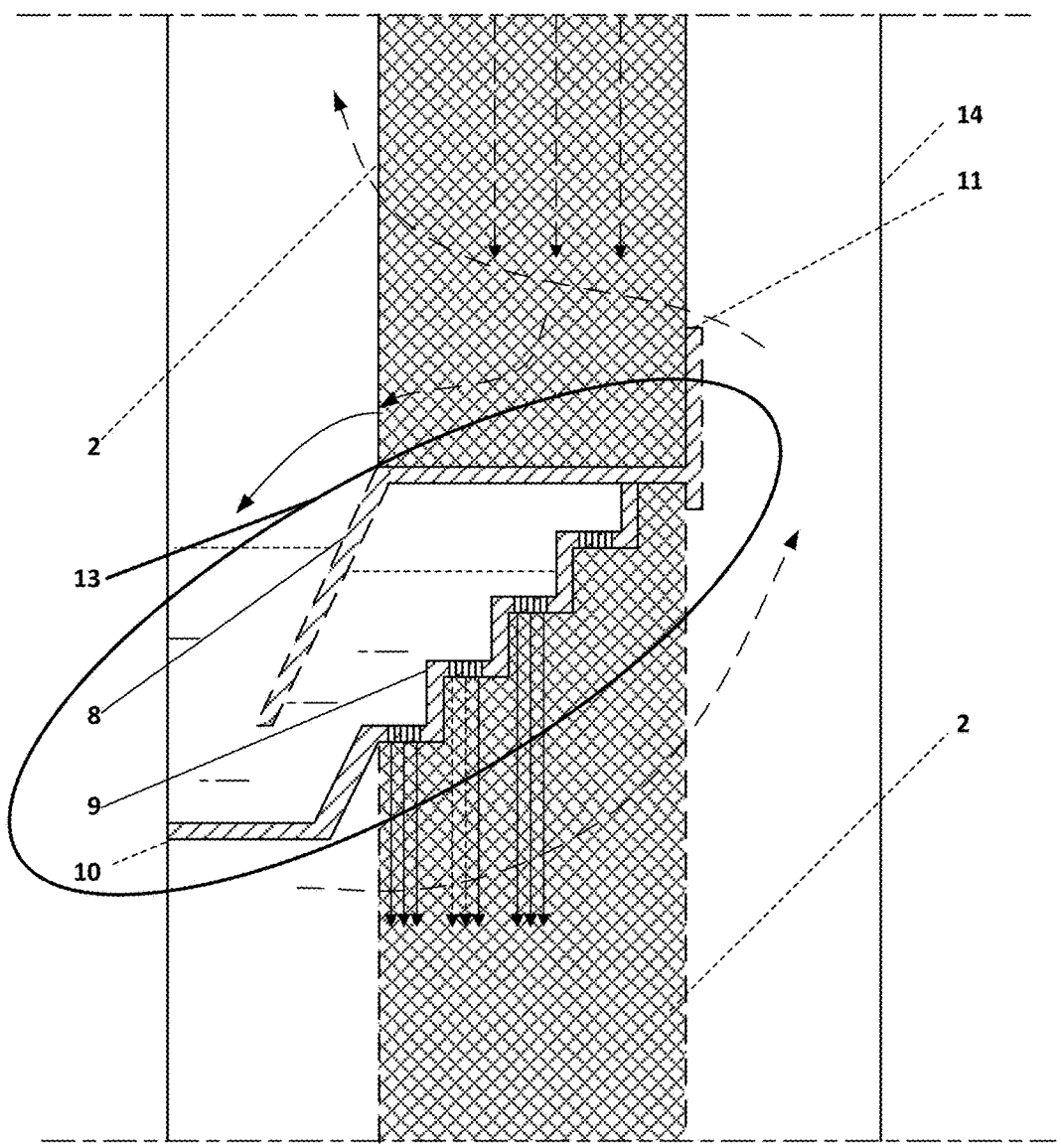
Figure 6:
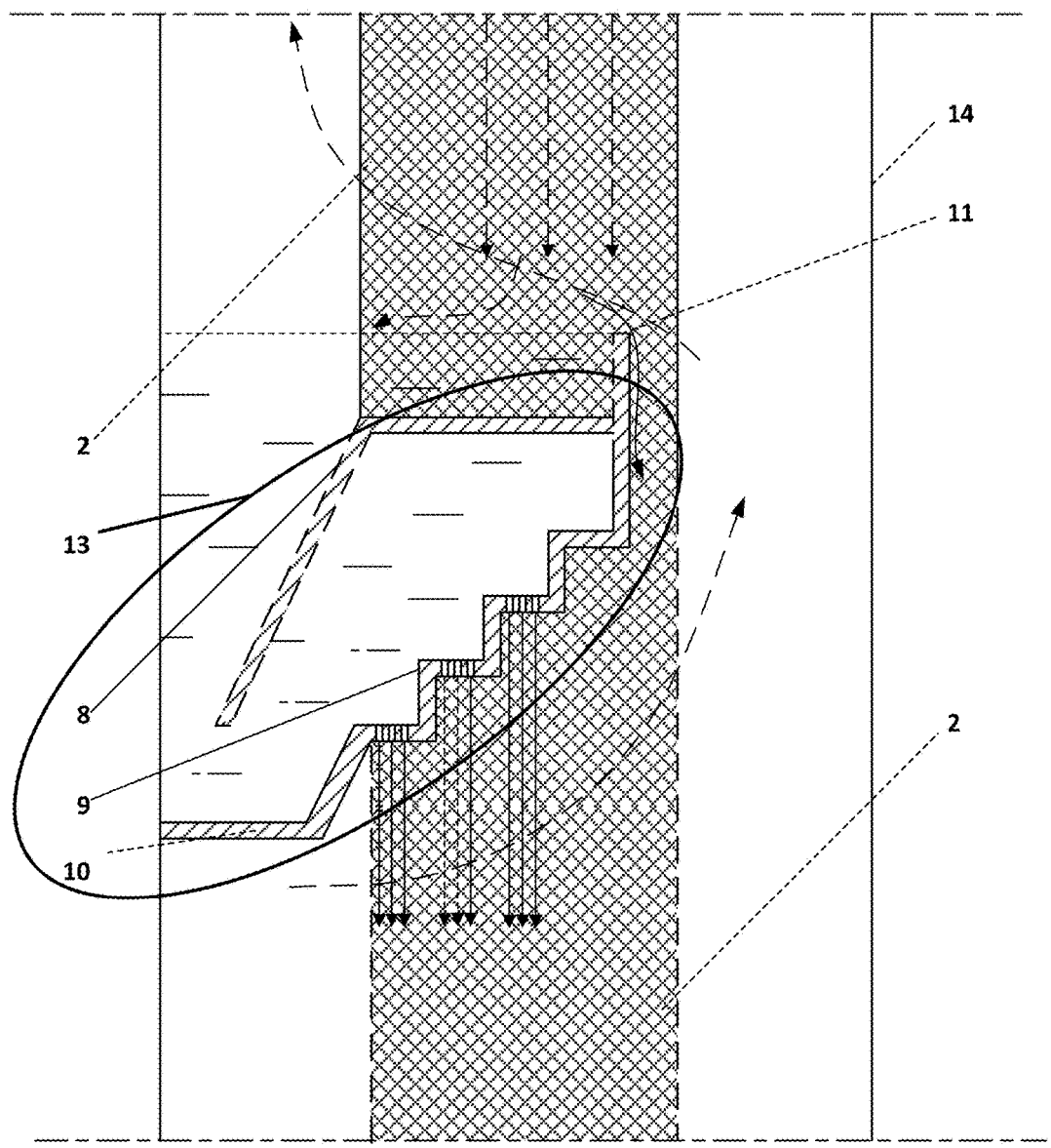

At liquid phase maximum design flow rate, the mass transfer column operates in the mode, where the entire volume of liquid phase distributor is filled up to the space between the last upper step of set of steps 9 and horizontal baffle 8 is filled with liquid phase, which ensures the required liquid phase flow in the column to all packing fragments of cross-flow packing downstream section 2 in the direction of vapour stream (FIG. 5). If liquid phase actual flow rate exceeds the maximum design flow rate, the liquid distributor 13 will overfill and the excessive liquid phase will overflow through vertical plate 11 from the cross-flow packing upstream section to the blind pocket of the cross-flow packing downstream section (FIG. 6).

Figure 7:
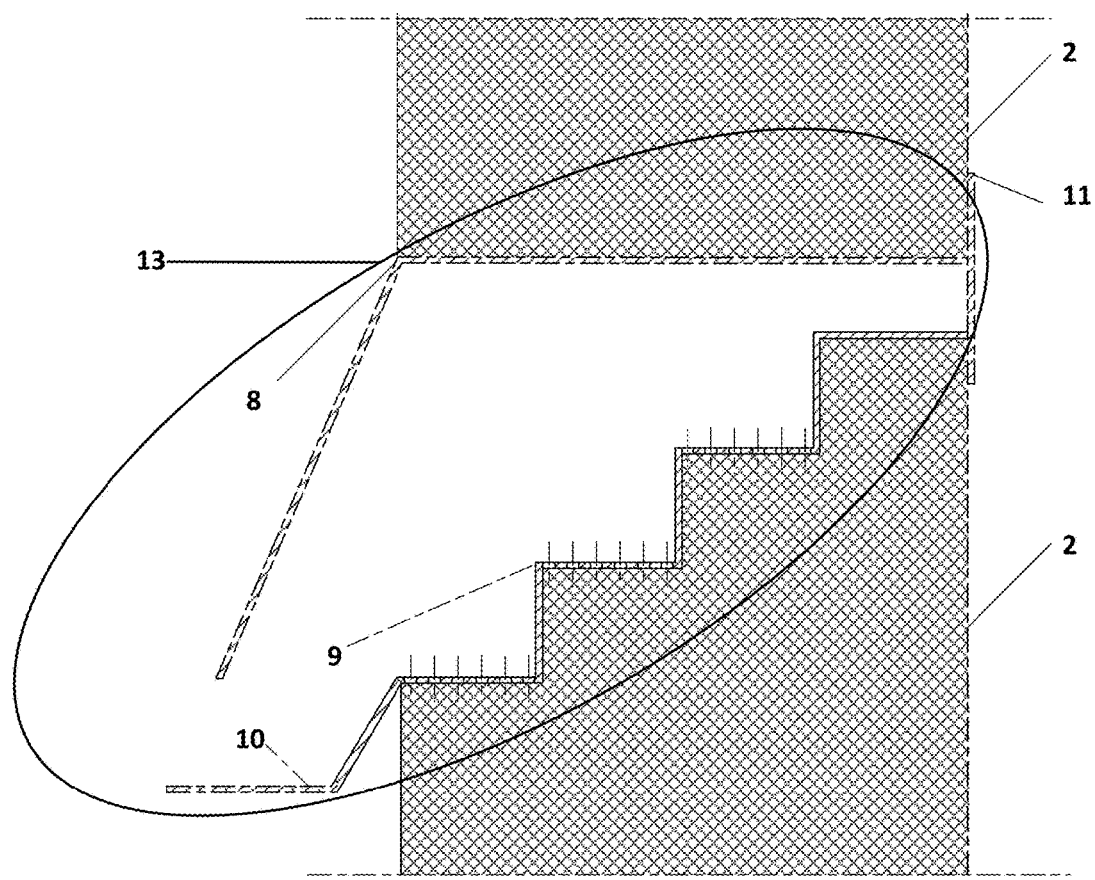
Figure 8:
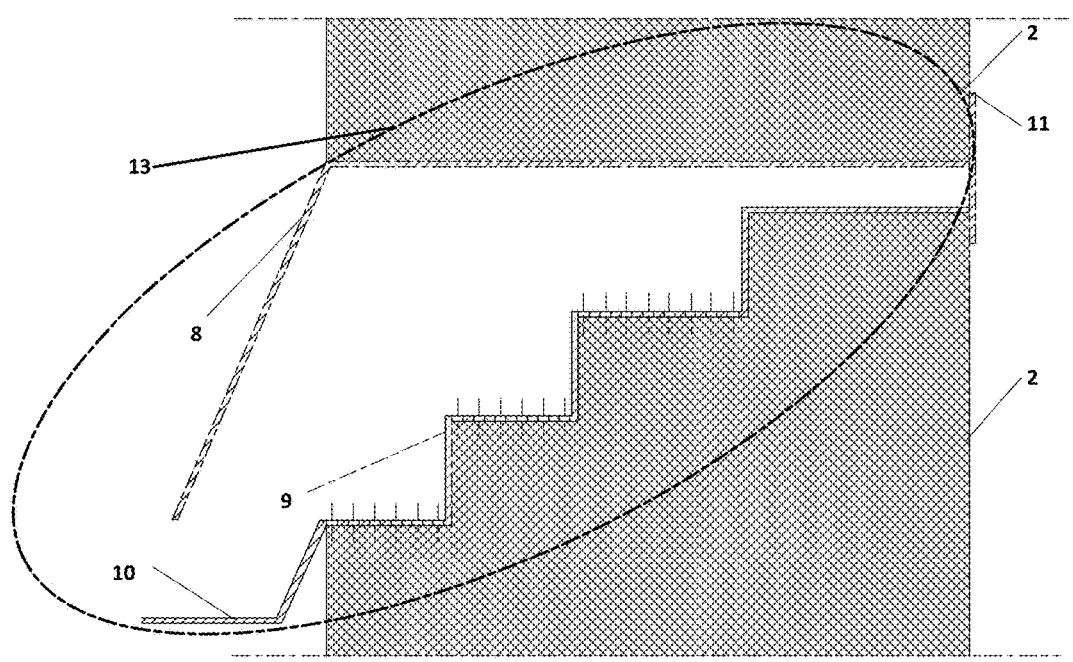
Figure 9:
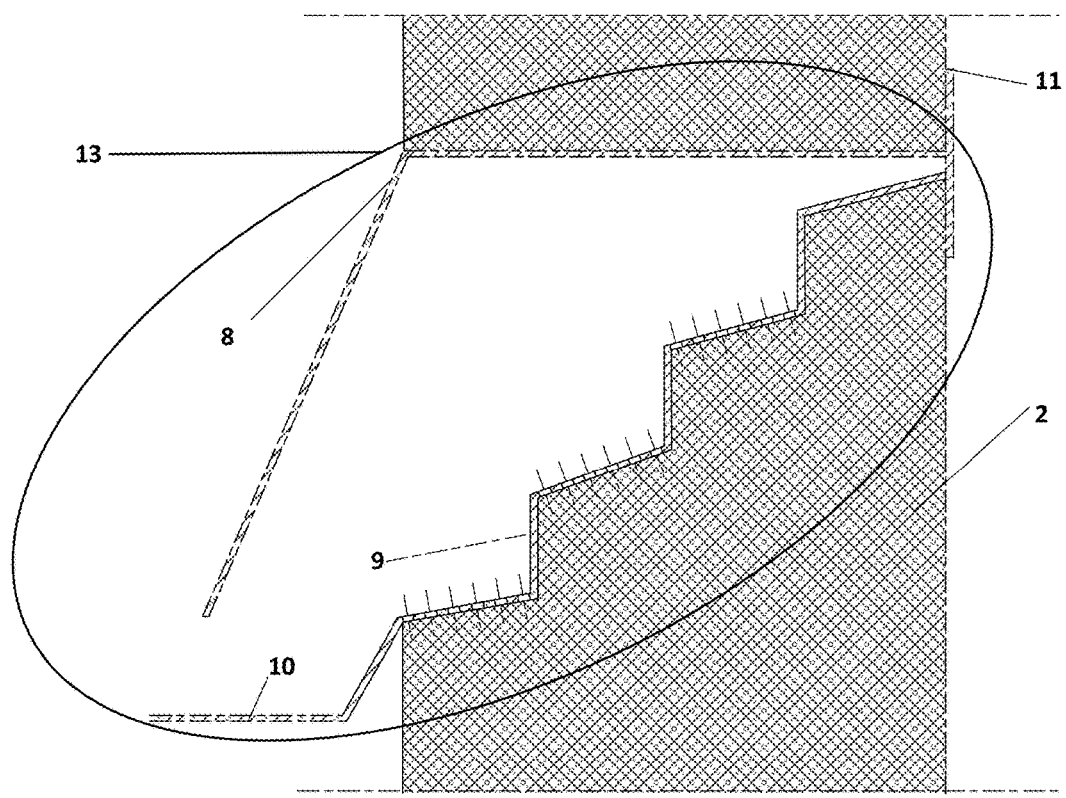
Figure 10:
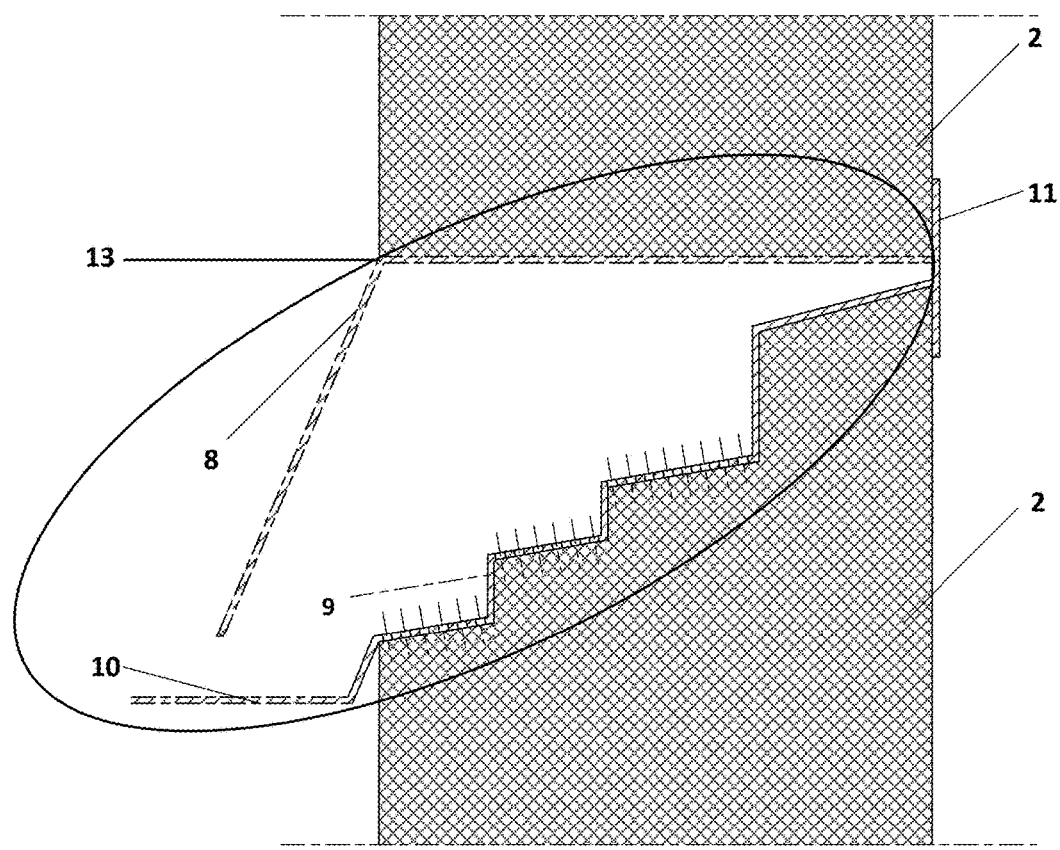

Depending on the mass transfer column operational specifics, the drain plates of set of steps 9 with perforated holes can have equal length in case of uniform variation of the column liquid phase capacity (FIGS. 7 and 9) or have different length in case of the non-uniform variation of the column liquid phase capacity (FIGS. 8 and 10).

Depending on the mass transfer column operational specifics, the drain plates of set of steps 9 with perforated holes can be horizontal in case of discrete variation of the column liquid phase capacity (FIGS. 7 and 8) or be inclined at an acute angle to the horizon with the ability of almost indiscrete variation of the column liquid phase capacity (FIGS. 9 and 10) from the minimum value to the maximum one.

Figure 11:
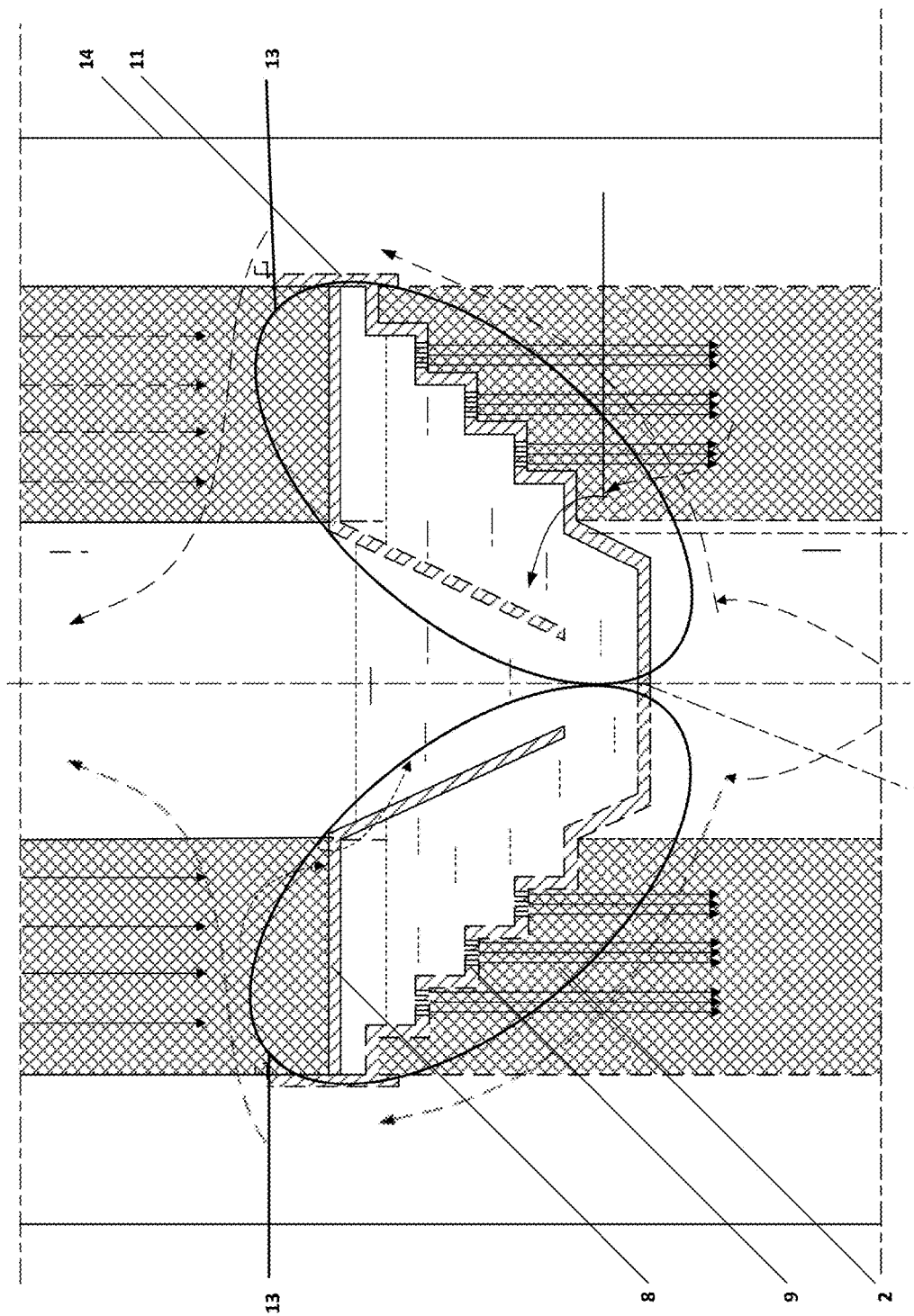

FIG. 11 shows a fragment of a double-flow option of the multi-flow column, where, to reduce the column hydraulic resistance, the column shell accommodates two parallel sets of cross-flow packing sections, where the blind pocket bottoms of two symmetrical cross-flow packing sections of the vertical set of cross-flow packing sections forming one flow are joined by solid bridge 12 isolating the vapour phase supply channel.

Figure 12:
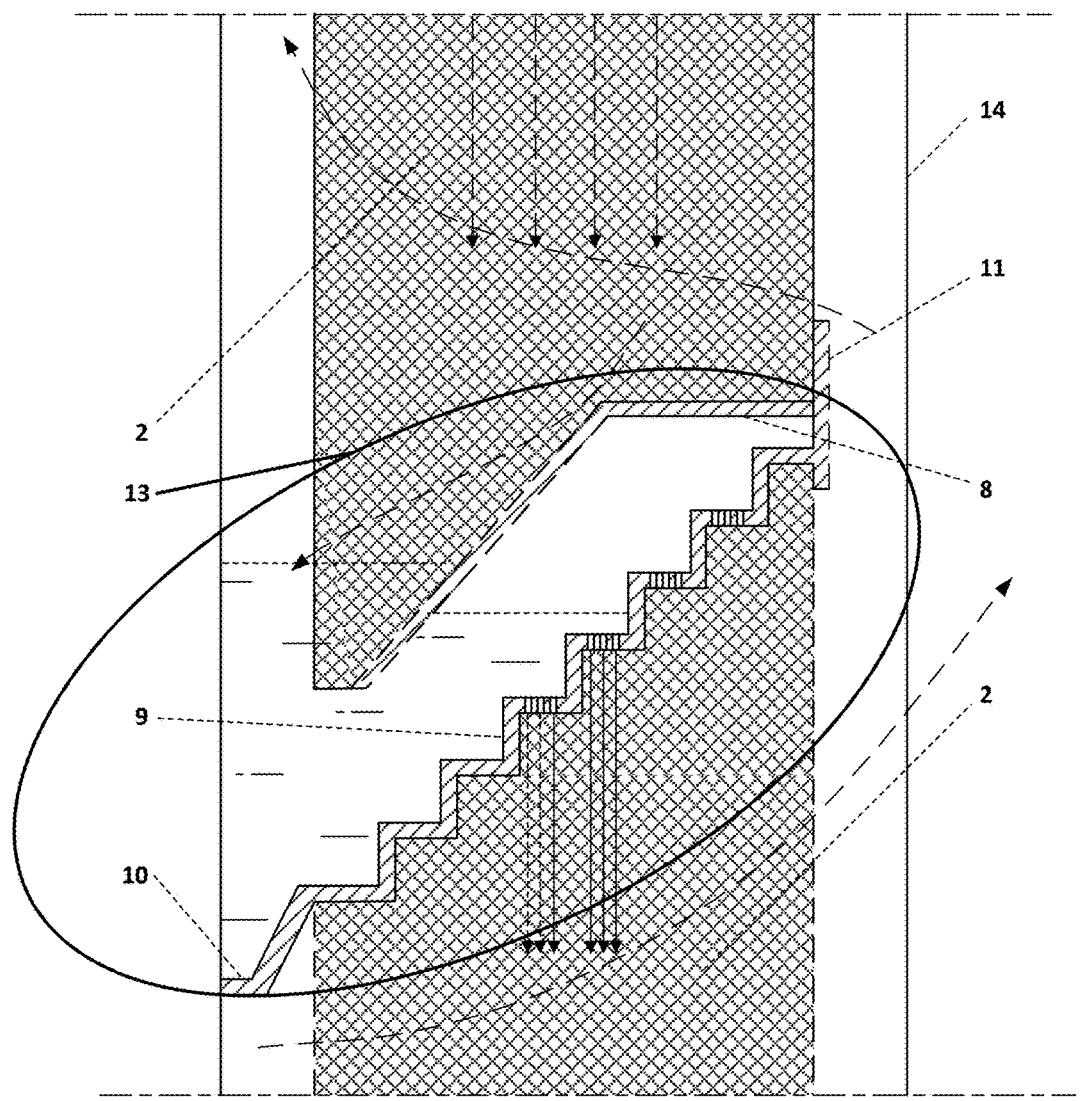

FIG. 12 shows a fragment of the reconstructed mass transfer column with an increased cross section of the cross-flow packing section, leading to offset of the distributor horizontal baffle edge deep into the inter-section space.

In case of absorption gas treatment with liquid absorbent, the mass transfer column of cross flow of liquid and gas (vapour) phases operates in a similar manner.

The claimed invention is corroborated by the following embodiments.

Embodiment 1

In the continuous mass transfer column with a 100% rated maximum flow rate of reflux stream in the column, the liquid distributors have a set of 10 steps with horizontal perforated drain plates; herewith, the liquid phase level on the perforated drain plate at the lower step equaling half height of the end plate of the lower step will ensure the minimum flow rate of reflux stream of at least 5%, which forms the range of stable operation of the mass transfer column in the range of at least 5-100%; and the vessel is capable of self-similar implementation of at least 11 process modes of reflux stream rate.

Embodiment 2

The batch mass transfer column separates a four-component reaction mixture comprising 10%, 20%, 30% and 40% (respectively) of various components at gradually increasing boiling temperature and with reflux ratio of 10 at withdrawal of each component. The liquid distributors have a set of three steps with horizontal perforated drain plates with equal width. During the batch mass transfer column operation, in case of stripping of the first component the first lower step of the liquid distributor will be in operation, in case of stripping of the second component—two lower steps of the liquid distributor, in case of stripping of the third component—all the three steps of the liquid distributor.

Embodiment 3

The batch mass transfer column separates a four-component reaction mixture comprising 20%, 10%, 30% and 40% (respectively) of various components at gradually increasing boiling temperature and with reflux ratio of 10 at withdrawal of each component. The liquid distributors have a set of three steps with horizontal perforated drain plates with equal width. During the batch mass transfer column operation, in case of stripping of the first component two lower step of the liquid distributor will be in operation, in case of stripping of the second component—only one lower step, in case of stripping of the third component—all the three steps of the liquid distributor.

Embodiment 4

In the continuous mass transfer column with a 100% rated maximum flow rate of the reflux stream in the column, the liquid distributors have a set of 10 steps with horizontal perforated drain plates. During the column reconstruction, in order to increase the reflux flow rate up to 120%, the cross section of the cross-flow packing section was enlarged by 20%, therefore the number of steps of the liquid distributor was increased from 10 to 12, the bent-down edge of the part A horizontal baffle was raised above the blind pocket bottom to the height of two additional lower steps of part B and shifted towards the upper step of part B by the value equal to total length of two additional lower steps of part B. As a result of the described reconstruction, the liquid phase capacity of the mass transfer column increased up to 120% with a quite broad range of the column stable operation maintained from 20% to 100%.

Embodiment 5

Figure 13:
Figure 14:
Figure 15:

On the full-scale bench 2000 mm high and 400 mm wide, operational hydrodynamics with the water-air system of the double-flow option fragment of multi-flow column was tested under the claimed invention, where, to reduce the column hydraulic resistance, the column shell accommodates two parallel sets of cross-flow packing sections, where the blind pocket bottoms of two symmetrical cross-flow packing sections of the vertical set of cross-flow packing sections forming the single flow are joined by solid bridge isolating the vapour phase supply channel. FIGS. 13 to 15 illustrate different stages of the study. FIG. 13 demonstrates operation of the double-flow column bottom part at the 80% liquid phase flow rate; FIG. 14 demonstrates operation of the double-flow column bottom part at the 50% liquid phase flow rate, FIG. 15 demonstrates the liquid distributor operation of one section of the double-flow column at the 90% liquid phase flow rate. The tests showed that the column stable operation range under the claimed invention is within 5% to 100%. The tests showed that the column stable operation range under the claimed invention is within 5% to 100%.

Therefore, the claimed invention allows achieving the objective of development of a highly efficient mass transfer column that allows for a dramatic variation of the liquid phase flow rates, which ensures a considerable extension of the vessel stable operation range well as the possibility to use the contact devices with a different number of flows in one vessel.

The invention claimed is:

1. A mass transfer column of cross flow of liquid and gas (vapour) phases including:
   a shell,
   a feed nozzle, distillate vapor and residue withdrawal nozzles,
   nozzles of injection and withdrawal of auxiliary process gas (vapour) and liquid flows, and
   cross-flow packing sections limited on two opposite sides by continuous side walls and separated heightwise by horizontal baffles having, successively, in the direction of gas (vapour) phase, in normal cross section of the shell, a window for gas (vapour) flowing on the inlet side of the cross-flow packing section and a continuous area on the outlet side of the cross-flow packing section, which alternate on the horizontal baffles neighbouring by height;
   liquid distributors between the adjacent sections of the cross-flow packing and above the upper section of the cross-flow packing comprising a part A, a part B, and a part C;
   wherein the part A is a horizontal baffle with a bent-down edge tightly, the horizontal baffle attached to said two opposite continuous side walls and mated to a part B on the opposite side;
   wherein the part B is shaped as a set of steps, each step being made of two mating continuous end and perforated drain plates that are tightly attached to said two opposite continuous side walls limiting the cross-flow packing section, the drain plate of a lower step being mated to a part C;
   wherein the part C is shaped as a blind pocket tightly attached to said two opposite continuous side walls, with a bottom and a side, an upper edge of the blind pocket side being mated to the drain plate of the part B lower step;
   wherein the blind pocket is mated to the shell and the bent-down edge of the part A horizontal baffle is lowered into part C with a gap relative to the blind pocket bottom; and
   wherein the upper step of part B is equipped with a vertical plate partially isolating the gas phase outflow from the packing layer of the cross-flow packing downstream section and the lower part of the packing layer of the cross-flow packing upstream section.

2. The mass transfer column as defined in claim 1, wherein the liquid distributor part B drain plates are positioned horizontally.

3. The mass transfer column as defined in claim 1, wherein the liquid distributor part B horizontal drain plates are of equal width.

4. The mass transfer column as defined in claim 1, wherein a width of the liquid distributor part B horizontal drain plates gradually increases from the lower step to the upper one.

5. The mass transfer column as defined in claim 1, wherein the liquid distributor part B drain plates are made inclined at an acute angle to the horizon from the lower step to the upper one.

6. The mass transfer column as defined in claim 1, wherein the liquid distributor part B inclined drain plates are of equal width.

7. The mass transfer column as defined in claim 1, wherein a width of the liquid distributor part B inclined drain plates gradually increases from the lower step to the upper one.

8. The mass transfer column as defined in claim 1, wherein the vertical plate is used to partially isolate the lower part of the packing layer of the cross-flow packing upstream section to the height that ensures the liquid phase flow rate corresponding to the maximum column reflux stream capacity via the liquid distributor.

9. The mass transfer column as defined in claim 1, wherein the gap between the bent-down edge of the part A horizontal baffle and the bottom of the part C blind pocket does not exceed half height of the part B lower step end plate, which ensures the liquid phase flow rate corresponding to the minimum column reflux stream capacity via the liquid distributor.

10. The mass transfer column as defined in claim 1, wherein the column is built symmetrically to a multi-flow one wherein two symmetrical cross-flow packing sections are vertically and symmetrically arranged within the mass transfer column.

11. The mass transfer column as defined in claim 10, wherein, in the multi-flow column the bottoms of blind pockets at two symmetrical opposite sections of cross-flow packings in the vertical set of cross-flow packing sections forming one flow are joined using a solid bridge that isolates the gas (vapour) phase supply channel.

12. The mass transfer column as defined in claim 11, wherein the gap between the bent-down edge of the part A horizontal baffle lowered into part C and the blind pocket bottom is equal to the height of 15-30% of the part B lower steps; the edge of the part A horizontal baffle is offset towards the part B upper step with a vertical plate by the value equal to the total length of 15-30% of the part B lower steps.

13. The mass transfer column as defined in claim 2, wherein the liquid distributor part B horizontal drain plates are of equal width.

14. The mass transfer column as defined in claim 2, wherein a width of the liquid distributor part B horizontal drain plates gradually increases from the lower step to the upper one.

15. The mass transfer column as defined in claim 5, wherein the liquid distributor part B inclined drain plates are of equal width.

16. The mass transfer column as defined in claim 5, wherein a width of the liquid distributor part B inclined drain plates gradually increases from the lower step to the upper one.

* * * * *